Patented Apr. 11, 1950

2,504,001

UNITED STATES PATENT OFFICE 2,504,001

PREPARATION OF SILICA-VANADIA CATALYST

Gerald C. Connolly, Elizabeth, N. J., assignor to Standard Oil Development Company, a corporation of Delaware No Drawing. Application October 16, 1946, Serial No. 703,473

1 Claim. (Cl. 252—448)

This invention relates to the art of producing adsorbent inorganic oxide gels and pertains more particularly to a method of preparing such gels in spherical or round-like form.

Inorganic gels, and particularly silica gels, have found widespread use in various fields, such as adsorbents for gases or vapors and as catalyst components in many types of catalytic reactions. In the latter role, the gel may serve as a catalyst or as an extender or carrier for other active catalytic components incorporated in the gel structure.

It has previously been proposed to prepare such gels in spherical form by spraying or otherwise dispersing a gel-forming sol in the form of droplets into a fluid medium, such as a liquid or gas capable of preventing the coalescence of the droplets into excessively large agglomerates and causing the sol to set within such medium.

The medium which prevents such coalescence, in the case of hydrosols, should be water immiscible and may comprise petroleum fractions, such as naphtha, kerosene, gas oil and lubricating oils, or coal tar fractions, such as toluol and xylol.

According to previous practices, with which I am familiar, a crude gel-forming hydrosol is first formed which contains reaction impurities resulting from the formation of such sol. This crude hydrosol is then dispersed and caused to set into spherical hydrogel pellets in a non-coalescing medium such as previously described. Following the formation of the hydrogel spheres, it has been necessary to subject such spheres to extensive washing treatment to remove the original crude impurities. During this extensive washing treatment a considerable portion of the spheres may become broken up or caused to coalesce with other spheres, thus requiring rejection of a considerable portion of the material.

One of the principal objects of the present invention is to provide a simple and direct method of preparing preformed spherical gel pellets which will not require the extensive washing treatment previously described and which will produce a gel having a minimum of reaction impurities.

Another important object of the invention is to provide a simple and direct method of incorporating additional components into the gel structure in a truly homogeneous manner.

In accordance with the present invention, a crude hydrosol is first formed by conventional methods and the hydrosol is allowed to set into a crude hydrogel. This hydrogel is then broken up and thoroughly washed to remove substantially all of the reaction impurities. Following the washing treatment the washed and purified hydrogel is reverted back into a sol or quasi-sol and the sol thus formed is then converted into spherical hydrogel particles by conventional methods.

While the washed and purified hydrogel may be reverted back into a sol or quasi-sol in various ways, such as by peptization, refluxing or digesting with a small amount of ammonia at elevated temperatures, one simple and particularly suitable method, forming one of the specific phases of my invention, is to subject the hydrogel to an intense mulling treatment, such as in a colloidal mill or other suitable mixer capable of subjecting the gel to intensive kneading or mulling treatment.

During the and as a result of the mulling operation, the hydrogel (for example, a silica hydrogel containing 10% silica and 90% water) passes through several forms, first, a white, opaque, dry-like powder, second, an almost water-clear sol, which sol, on standing, goes over to a tacky, pasty mass and eventually resets to a tough, clear hydrogel. According to one phase of the invention, the mulling is continued until the hydrogel is sufficiently fluid and is then thoroughly dispersed in droplet form into a suitable sphere-forming medium, as previously described. As another alternative, the hydrogel is mulled to the sol and allowed to stand until the tacky condition has almost disappeared. The partially set material is forced through a screen, a small amount of water added if need be, and then converted into the spherical form by a simple rolling or tumbling operation.

The crude hydrosol is prepared in a conventional manner and may be a sol of a single gel-forming component, or it may be a plural or mixed sol containing a plurality of gel-forming components. Where it is desired to incorporate other components into the gel structure, these components may be incorporated during the mulling of the hydrogel. For example, a cracking catalyst comprising silica and magnesia of any desired ratio can be prepared by mulling a mixture of the silica hydrogel with magnesia. A cracking catalyst comprising alumina and boron oxide may be prepared by mulling a purified alumina jelly with solid boron oxide or boric acid.

An oxidation catalyst comprising vanadium oxide silica or vanadium oxide and alumina may be prepared by mulling solid vanadium oxide or an ammonium vanadate solution with a purified hydrous oxide jelly of silica or alumina.

The above methods are of particular value where it is desired to incorporate relatively large amounts of the active catalytic component into the gel structure. Also, the methods allow for considerable flexibility for introducing certain catalysts into the gel structure that would have been effected or partially lost by any subsequent purifying or washing step. Furthermore, catalysts made by these methods are always homogeneous in that the active ingredient is uniformly dispersed throughout the structure.

The following example serves to illustrate in a more specific manner the method of carrying out my invention:

Example

A catalyst comprising silica and vanadium oxide suitable for use as an oxidizing or dehydrogenating catalyst was prepared by first forming a silica hydrosol by conventional procedure and allowing the crude silica hydrosol to set into a hydrogel. After the hydrogel had been fully developed, it was broken up and thoroughly washed until substantially free of reaction impurities. The resulting washed material was then put in a mulling machine and a solution of ammonium vanadate in an amount sufficient to give 10% vanadium oxide in the catalyst was introduced into the mulling machine. The hydrosol was mulled for a period sufficient to convert the hydrogel into a viscous fluid comparable to a thin lard. This material was then injected in droplet form into the top of a column containing a petroleum fraction of the gas oil boiling range. The droplets introduced into the top of the column were passed downwardly and were converted into firm spherical hydrogel pellets during the course of their passage downwardly through the oil. Either the sol or the dispersing oil, or both, may be heated, if need be. The pellets were caught in the bottom of the tower in a layer of water and subsequently removed from the tower, dried and heated according to conventional procedure. Any small amount of ammonium vanadate leached from the impregnated hydrogel spheres was used for make-up of subsequent vanadate solutions necessary for impregnation, or the preferred method is to use a saturated water solution of ammonium vanadate for the bottom layer.

While I have described the preferred embodiment of the invention, it will be understood that it embraces such other variations and modifications as come within the spirit and scope thereof.

What is desired to be protected by Letters Patent is:

In a method of preparing a catalyst comprising silica and vanadium oxide, the improvement which comprises reacting a sodium silicate solution with an acid to form a silica hydrosol containing sodium salt as an impurity, converting said silica hydrosol into a silica hydrogel, washing the silica hydrogel to remove sodium salt therefrom, thereafter intensively mulling the washed silica hydrogel in the presence of a solution of ammonium vanadate for a period sufficient to convert said silica hydrogel into a fluid, dividing the fluid so formed into a multiplicity of spherical droplets, converting the spherical droplets into firm, non-fluid hydrogel spherical particles by passing the spherical droplets down through a column of a water-immiscible liquid superimposed on a layer of a saturated water solution of ammonium vanadate to minimize leaching out of the vanadium salt as the spherical hydrogel particles leave the water-immiscible liquid and pass into the layer, removing the spherical hydrogel particles from the water and drying them to form dry spherical gel particles.

GERALD C. CONNOLLY.

REFERENCES CITED

The following references are of record in the file of this patent:

UNITED STATES PATENTS

| Number | Name | Date |
|---|---|---|
| 1,775,640 | Griessbach | Sept. 16, 1930 |
| 1,835,420 | Neudlinger | Dec. 8, 1931 |
| 1,935,177 | Connolly | Nov. 14, 1933 |
| 2,027,316 | Johnson | Jan. 7, 1936 |
| 2,163,922 | Stoewener | June 27, 1939 |
| 2,299,768 | Shabaker | Oct. 27, 1942 |
| 2,326,523 | Connolly | Aug. 10, 1943 |
| 2,385,217 | Marisic | Sept. 18, 1945 |
| 2,391,482 | Ruthruff | Dec. 25, 1945 |
| 2,435,379 | Archibald | Feb. 3, 1948 |